Patented May 13, 1947

2,420,630

UNITED STATES PATENT OFFICE 2,420,630

DISAZO DYE COMPOUNDS

George J. Taylor, Rochester, N. Y., assignor to Eastman Kodak Company, Rochester, N. Y., a corporation of New Jersey No Drawing. Application August 15, 1942, Serial No. 454,905

1 Claim. (Cl. 260—187)

This invention relates to new substantive disazo dye compounds.

It is an object of my invention to provide new disazo dye compounds. Another object is to provide new disazo dye compounds useful in color photography. A further object of my invention is to provide disazo dye compounds which color cotton and wool. A still further object is to provide a satisfactory method for the preparation of the new disazo dye compounds.

The new disazo dye compounds have the general formula:

$$R-N=N-R_1-N=N-R_2$$

wherein R—N=N— represents the residue of a member selected from the group consisting of a diazotized monocyclic aminoaryl nucleus of the benzene series and a diazotized aminonaphthalene nucleus, said member having a substituent selected from the group consisting of an amido group and a sulfonamido group attached directly through nitrogen to its nucleus, $R_1$—N=N— represents the residue of a diazotized member selected from the group consisting of a 1-amino-2,5-dialkoxybenzene and a 1-amino-2-alkoxynaphthalene and $R_2$ represents the residue of a member selected from the group consisting of a 2-benzoylamino-8-hydroxynaphthalene-6-sulfonic acid, a 2-acylamino-8-hydroxynaphthalene-6-sulfonic acid, a 2-benzoylamino-8-hydroxynaphthalene-3,6-disulfonic acid, a 2-acylamino-8-hydroxynaphthalene-3,6-disulfonic acid, a 2-benzoylamino-6-hydroxynaphthalene-8-sulfonic acid and a 2-acylamino-6-hydroxynaphthalene-8-sulfonic acid.

While my invention relates broadly to the disazo dye compounds having the above formula, it relates more particularly to those compounds in which at least one of the members R and $R_1$ contains a nuclear sulfonic acid group and in which the amido grouping or the sulfonamido grouping is attached to the benzene or naphthalene nucleus R in para position to the azo bond. Normally, the amido grouping joined to the benzene or naphthalene nucleus R is an alkylamido group represented by the formula:

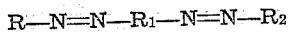

The new disazo dye compounds of my invention are useful in processes of color photography depending upon the chemical bleaching of dyes in the presence of developed silver images. Thus, they are useful in the color photography process disclosed in Christensen U. S. Patent 1,517,049, issued November 5, 1924. Further, they are useful in the color photogrpahy process disclosed in the copending Ehrenfried application Serial No. 360,622, filed October 10, 1940 (now United States Patent 2,322,001, dated June 15, 1943). The disazo dye compounds of my invention do not diffuse through set gelatin and, therefore, require no precipitating agent to prevent diffusion. Further, these new disazo dyes possess desirable spectral obsorption properties, for example, for the cyan (blue-green) dye in three-color photography. The new disazo dye compounds of the invention can be used in suitable color photography processes as either image or filter dyes. They are especially of use as image dyes in multilayer color films. In addition to their utility for color photography purposes, the new disazo dyes likewise can be employed to color cotton and wool.

The new disazo dye compounds of my invention can be prepared by diazotizing the monocyclic aminobenzene or aminonaphthalene nucleus defined hereinbefore, coupling the diazonium compound obtained with a 1-amino-2-alkoxynaphthalene or a 1-amino-2,5-dialkoxybenzene, diazotizing the monoazo dye thus formed and coupling the diazonium compound obtained with a 2-benzoylamino-8-hydroxynaphthalene-6-sulfonic acid, a 2-acylamino-8-hydroxynaphthalene-6-sulfonic acid, a 2-benzoylamino-8-hydroxynaphthalene-3,6-disulfonic acid, a 2-acylamino-8-hydroxynaphthalene-3,6-disulfonic acid, a 2-benzoylamino-6-hydroxynaphthalene-8-sulfonic acid or a 2-acylamino-6-hydroxynaphthalene-8-sulfonic acid.

As first components that can be employed in the preparation of the disazo dye compounds of the invention may be mentioned p-aminoacetanilide, m-aminoacetanilide, 2-amino-5-acetaminobenzenesulfonic acid, 2-acetamino-5-aminobenzenesulfonic acid, 1-amino-4-oxalylaminobenzene, 2-oxalylamino-5-aminobenzenesulfonic acid, 2-amino-5-oxalylaminobenzenesulfonic acid, 1-amino-3-propionylaminobenzene, 1-amino-4-butyrylaminobenzene, 1-amino-4-(N-methyl-N-acetyl-)-aminobenzene, 1-amino-4-benzoylaminobenzene, 1-amino-2-benzoylaminobenzene, N-(p-aminophenyl)-succinimide, N-(p-aminophenyl)-maleinimide.

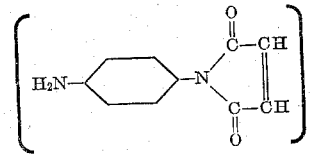

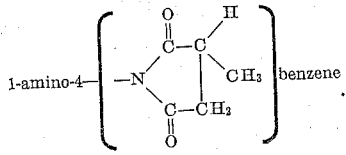

1-(4'-aminophenyl)-3-methyl-5 - pyrazolone, N-p-aminophenyl)-2-pyrrolidone, 1-amino-4-methylsulfonylaminobenzene

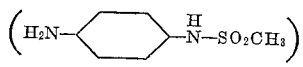

N-(phenylsulfonyl)-p-phenylenediamine, 1-amino-4-ethylsulfonyl - aminobenzene, 1 - amino - 4-butylsulfonylaminobenzene, N-(p-toluene-sulfonyl-p-phenylenediamine, 1-amino-4-cetylsulfonylaminobenzene, 5-amino - 2 - propionylaminobenzenesulfonic acid, 5-amino-2-acetaminobenzenesulfonemethylamide, N - (p - aminophenyl)-phthalimide

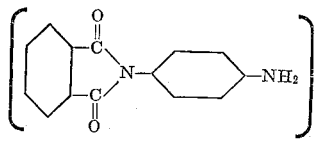

1 - amino - 2 - ethylsulfonylaminobenzene, 1-amino-3-methylsulfonylaminobenzene,

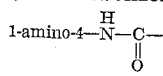

(butyl, amyl, hexyl, octyl, decyl or cetyl)-benzene, 1-amino-4-acetaminonaphthalene, 1-amino-4-acetaminonaphthalene-6-sulfonic acid, 1-amino-4-acetaminonaphthalene-7 - sulfonic acid, 1-amino-4-benzoylaminonaphtalene, 1-amino - 4-benzoylaminonaphthalene-6-sulfonic acid, 1-amino-4-benzoylaminonaphthalene - 7 - sulfonic acid and 1-amino-2-p-toluenesulfonylaminonaphthalene.

Second components that can be employed include, for example, 1-amino-2-ethoxynaphthalene, 1 - amino - 2-ethoxynaphthalene-6-sulfonic acid, 1 - amino - 2-ethoxynaphthalene-7-sulfonic acid, 1-amino-2-methoxynaphthalene, 1-amino-2-propoxynaphthalene-6-sulfonic acid, 1-amino-2-butoxynaphthalene-7-sulfonic acid, 1-amino-2,5-dimethoxybenzene, 1-amino-2,5-diethoxybenzene, 1-amino-2,5-dipropoxybenzene, 1-amino-2-ethoxy-5-methoxybenzene and 1-amino-2,5-dibutoxybenzene.

Third components that can be employed include, for example, 2-(4''-amino-2'-benzamidobenzamido)-8-hydroxynaphthalene - 6 - sulfonic acid, 2 - (4'amino-benzamido)-8-hydroxynaphthalene-6-sulfonic acid, 2-benzoylamino-8-hydroxynaphthalene-6-sulfonic acid, 2-acetamino-8-hydroxynaphthalene-6-sulfonic acid, 2-propionylamino-8-hydroxynaphthalene-6 - sulfonic acid, 2 - (4'-acetamino-benzamido)-8-hydroxynaphthalene-6-sulfonic acid, 2-(4''-acetamino-4-benzamido-benzamido) - 8 - hydroxynaphthalene-6-sulfonic acid, 2-(2'-sulfo-4'-aminobenzamido)-8-hydroxynaphthalene-6 - sulfonic acid and the corresponding N-benzoyl and N-acyl derivatives of 2-amino-8-hydroxynaphthalene-3,6-disulfonic acid and 2-amino-6-hydroxynaphthalene-8-sulfonic acid. It will be understood that other N-benzoyl and N-acyl derivatives can be employed in addition to those specifically named, as only the simpler and more common N-benzoyl and N-acyl derivatives have been given.

It will be apparent from the illustrative first components given hereinbefore that the term "amido group" or "amido grouping" refers broadly to groups containing

linkage which are joined directly to the benzene nucleus through the nitrogen atom of the "amido group (or grouping)." Both open chain and cyclic groups are included. Similarly the term "sulfonamido group" or "sulfonamido grouping" refers to groups containing a —N—SO₂— linkage which are joined directly to the benzene nucleus through the nitrogen atom of the "sulfonamido group (or grouping)."

The dye compounds of my invention in which the member R contains an "amido grouping" yield blue-green shades. Those compounds wherein the member R contains a "sulfonamido group" yield magenta shades.

The following examples illustrate the preparation of the disazo dye compounds of the invention:

*Example 1*

37.5 grams (.25 gram mole) of p-aminoacetanilide are dissolved in 1000 grams of water and 60 grams of concentrated hydrochloric acid (specific gravity 1.18). The resulting solution is cooled to 10° C. and diazotized by adding, with stirring, 17.5 grams of sodium nitrite while maintaining the temperature at about 10° C. Stirring is continued for ½ hour after complete addition of the sodium nitrite at the end of which time the complete diazotization mixture is run into a suspension of 66.8 grams (.25 gram mole) of 1-amino-2-ethoxynaphthalene-7-sulfonic acid in 500 grams of water following which 50 grams of CH₃COONa.3H₂O are added and stirring is continued for about 24 hours. The reaction mixture is then cooled to 10° C. and made alkaline by the addition of 280 grams of 10% aqueous sodium hydroxide following which it is diazotized with 35 grams of sodium nitrite and 90 grams of concentrated hydrochloric acid (specific gravity 1.18). Throughout the diazotization reaction the reaction mixture is stirred while maintained at a temperature of about 10° C. After completion of the diazotization reaction which requires about two hours, the diazotization product is salted out with sodium chloride, recovered by filtration, and placed in sufficient water at 0° C. to form a paste. This diazotization product is then coupled at a temperature of 10° C. with a solution of 120 grams (.25 gram mole) of 2-(4''-amino-4' - benzamido-benzamido)-8-hydroxynaphthalene-6-sulfonic acid in 300 grams of pyridine and 135 grams of an aqueous 28% ammonia solution. The reaction mixture resulting is stirred for 24 hours at the end of which time the dye compound formed is recovered by filtration. This dye compound may be purified by salting it out of a water solution with a salt such as sodium chloride. The dye obtained has in its free acid state, the formula:

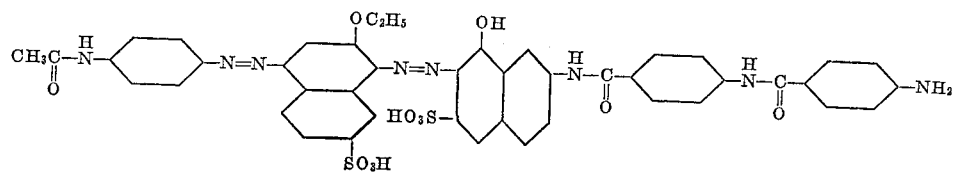

Example 2

0.25 gram mole of p-aminoacetanilide is diazotized and the diazonium compound obtained is coupled with 0.25 gram mole of 1-amino-2-ethoxynaphthalene-6-sulfonic acid and the monoazo dye thus obtained is in turn diazotized and coupled with 0.25 gram mole (90 grams) of 2-(4'-amino-benzamido)-8-hydroxynaphthalene-6-sulfonic acid. The dye compound obtained has in its free acid state the formula:

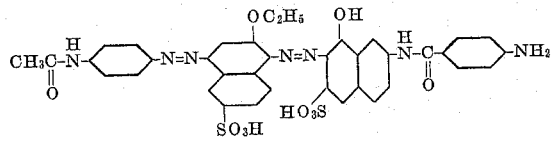

The diazotization, coupling and recovery operations necessary to the formation of the dye compound of this example can be carried out following the procedure described in detail in Example 1. The dye compound of this example is useful in the color photography process disclosed in the copending U. S. application of Robert A. Morris, Serial No. 446,054, filed June 6, 1942 (now U. S. Patent 2,326,055, dated August 3, 1943).

continued for two hours at the end of which time the diazonium reaction mixture is run into a solution of 5.7 grams of 1-amino-2-ethoxynaphthalene in 100 grams of water and 3.7 grams of concentrated sulfuric acid (specific gravity 1.84) at 15° C. The reaction mixture is stirred for about 24 hours at the end of which time it is cooled to 10° C. and made alkaline by the addition of 78 grams of a 10% aqueous sodium hydroxide solution. Following this, the reaction mixture is diazotized with 5 grams of sodium nitrite and 33 grams of concentrated hydrochloric acid (specific gravity 1.18). The diazotization is complete in about two hours at which time the diazotization product is salted out with sodium chloride, filtered off and placed in enough water to form a paste at 0° C. This diazotization product is then coupled with a solution of 10.7 grams of 2-(4'-aminobenzamido)-8-hydroxynaphthalene-6-sulfonic acid in 50 grams of pyridine and 23 grams of 28% aqueous ammonia at 10° C. The reaction mixture is stirred for 24 hours at which time the dye is filtered off and purified by salting out of a water solution by the addition of sodium chloride. The dye thus obtained corresponds in its free acid state to the formula:

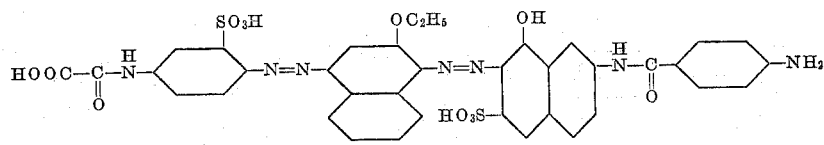

Example 3

0.25 gram mole of p-aminoacetanilide is diazotized and the diazonium compound obtained is coupled with 0.25 gram mole of 1-amino-2-ethoxynaphthalene-6-sulfonic acid and the monoazo dye thus obtained is in turn diazotized and coupled with 0.25 gram mole of 2-acetamino-8-hydroxynaphthalene-6-sulfonic acid. The dye compound obtained has in its free acid form the formula:

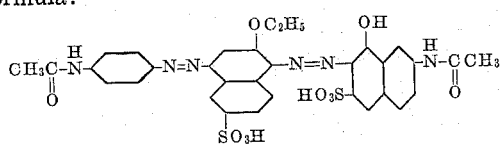

The diazotization, coupling and recovery operations necessary to the formation of the dye compound of this example can be carried out following the procedure described in detail in Example 1.

Example 4

7.8 grams of 1-amino-4-oxalylaminobenzene-2-sulfonic acid are dissolved in 50 grams of water and 24.5 grams of 10% aqueous sodium hydroxide. 2.1 grams of sodium nitrite dissolved in 20 parts of water are then added and the resulting solution is added slowly to 9.5 grams of concentrated hydrochloric acid (specific gravity 1.18) in 50 grams of water at 10° C. Stirring is

Example 5

0.25 gram mole of 1-amino-4-acetamino-naphthalene-7-sulfonic acid is diazotized and the diazonium compound obtained is coupled with 0.25 gram mole of 1-amino-2-ethoxynaphthalene-6-sulfonic acid and the monoazo dye thus obtained is in turn diazotized and coupled with 0.25 gram mole of 2-benzoyiamino-8-hydroxynaphthalene-6-sulfonic acid. The dye compound obtained has in its free acid state the formula:

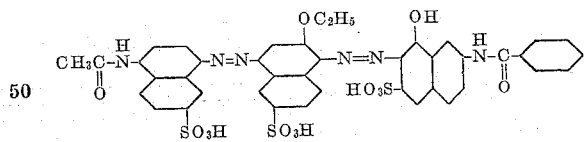

The diazotization, coupling and recovery operations necessary to the formation of the dye compound of this example can be carried out following the procedure described in detail in Example 4.

The compounds whose formulae are given hereinafter can be prepared following the general procedure described and illustrated in the foregoing examples. When the first diazonium component contains a sulfonic acid group the procedure described in Example 4 is ordinarily followed; if no sulfonic acid group is present, the general procedure described in Example 1 is employed.

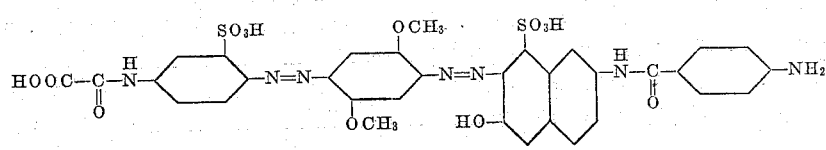

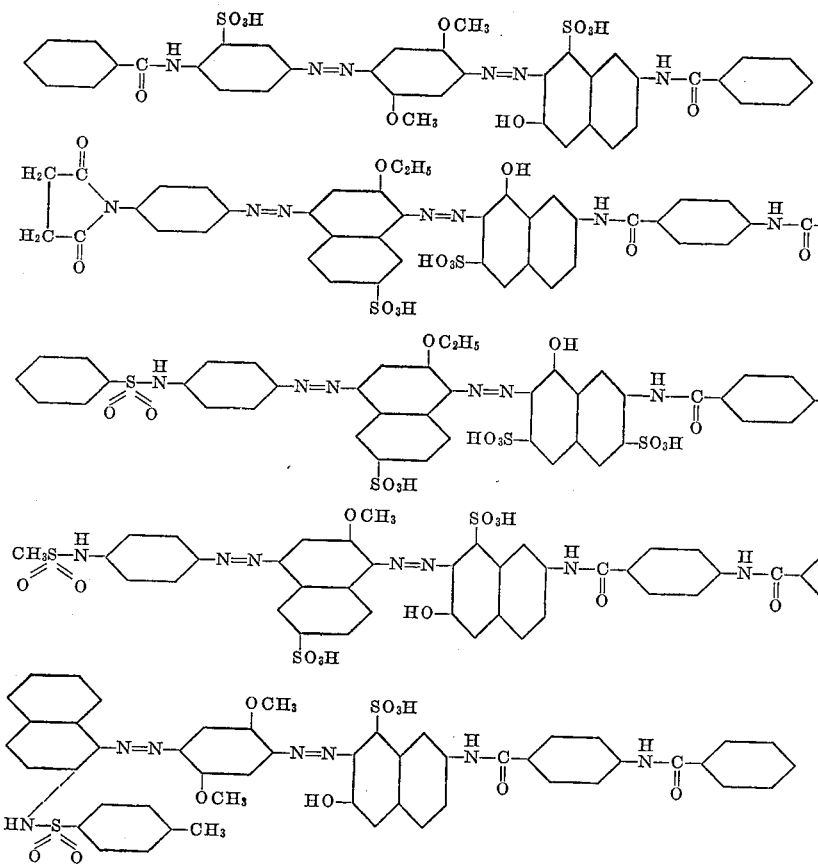

The following tabulation further illustrates the compounds of my invention. It will be understood that the components mentioned can be combined following the general procedure described in Examples 1 to 5, inclusive, or by variations of this procedure which are apparent to those skilled in the art to which this invention relates.

It will be understood that the disazo dye compounds specifically disclosed herein are intended to be illustrative and not limitative of my invention. Thus, within the teachings of the invention, the various components disclosed herein may be combined with one another to yield the new disazo dye compounds of the invention. To illustrate, p-aminoacetanilide in Example 1 can be

| First Component | Second Component | Third Component |
|---|---|---|
| m-aminoacetanilide | 1-amino-2-ethoxy-naphthalene-6-sulfonic acid. | 2-(4'-aminobenzamido)-8-hydroxynaphthalene-6-sulfonic acid. |
| N-(p-toluenesulfonyl)-p-phenylenediamine | do | Do. |
| 2-acetamino-5-amino-benzenesulfonic acid | do | Do. |
| 2-acetamino-5-amino-benzenesulfonmethyl-amide | do | 2-acetamino-8-hydroxynaphthalene-3,6-disulfonic acid. |
| N-(p-aminophenyl)-phthalimide | do | 2-acetamino-6-hydroxynaphthalene-8-sulfonic acid. |
| p-Aminoacetanilide | 1-amino-2-ethoxynaphthalene-7-sulfonic acid. | 2-(4'-acetaminobenzamido)-8-hydroxynaphthalene-6-sulfonic acid. |
| Do | do | 2-benzoylamino-8-hydroxynaphthalene-6-sulfonic acid. |
| Do | do | 2-acetamino-8-hydroxynaphthalene-6-sulfonic acid. |
| Do | do | 2-(4'-aminobenzamido)-8-hydroxynaphthalene-3,6-disulfonic acid. |
| Do | do | 2-(4'-amino-2'-sulfonic acid benzamido)-8-hydroxynaphthalene-6-sulfonic acid. |
| 1-(4'-aminophenyl)-3-methyl-5-pyrazolone | 1-amino-2-ethoxynaphthalene-6-sulfonic acid. | 2-(4'-aminobenzamido)-8-hydroxynaphthalene-6-sulfonic acid. |
| 1-(3'-aminophenyl)-3-methyl-5-pyrazolone | do | 2-(4'-acetaminobenzamido)-8-hydroxynaphthalene-6-sulfonic acid. |
| 1-(4'-aminophenyl)-3-carboxyl-5-pyrazolone | do | 2-(4'-acetaminobenzamido)-8-hydroxynaphthalene-3,6-disulfonic acid. |
| 1-(4'-aminophenyl)-3-carboxylic acid ethyl ester-5-pyrazolone | 1-amino-2-ethoxynaphthalene-7-sulfonic acid. | 2-(4'-aminobenzamido)-8-hydroxynaphthalene-6-sulfonic acid. |
| 1-(4'-aminophenyl)-3-phenyl-5-pyrazolone | do | 2-benzoylamino-6-hydroxynaphthalene-8-sulfonic acid. |
| 1-amino-4-acetaminonaphthalene | 1-amino-2-ethoxynaphthalene-6-sulfonic acid. | 2-(4'-aminobenzamido)-8-hydroxynaphthalene-6-sulfonic acid. |
| 1-amino-4-benzoylaminonaphthalene | do | 2-propionylamino-8-hydroxynaphthalene-6-sulfonic acid. |
| 1-amino-4-acetaminonaphthalene-6-sulfonic acid | 1-amino-2,5-dimethoxybenzene | 2-(4'-acetaminobenzamido)-8-hydroxynaphthalene-6-sulfonic acid. |
| 1-amino-4-benzoylaminonaphthalene-6-sulfonic acid | do | 2-acetamino-8-hydroxynaphthalene-3,6-disulfonic acid. |
| 1-amino-4-benzoylaminonaphthalene-7-sulfonic acid | 1-amino-2-ethoxynaphthalene-7-sulfonic acid. | 2-benzoylamino-8-hydroxynaphthalene-6-sulfonic acid. |
| 1-amino-2-p-toluenesulfonylaminonaphthalene | do | 2-propionylamino-6-hydroxynaphthalene-8-sulfonic acid. | replaced by an equivalent gram molecular weight of any of the other first components to obtain disazo dye compounds of the invention. That is, any first component can be replaced by any other first component, any second component can be replaced by any other second component and any third component can be replaced by any other third component.

When used to color wool and cotton, the disazo dye compounds of the invention can be applied to these materials by methods well known to the art for coloring these materials. When the disazo dye compounds are to be employed in color photography operations of the character indicated hereinbefore it will be understood that the manner of their employment is the same as described in the patents and applications referred to.

When used in photographic emulsion layers, the dyes of my invention are incorporated in amounts of from about 2.5 grams to 25 grams of dye per 100 grams of gelatin. The emulsions are coated to give a dye concentration of from 0.15 to 1.5 grams of dye per square meter of emulsion surface.

It will be understood that the term "benzoylamino" as used herein and in the claim, unless otherwise indicated, includes not only the unsubstituted benzoylamino group but also substituted benzoylamino groups as has been indicated hereinbefore.

I claim:

The disazo compound having the formula:

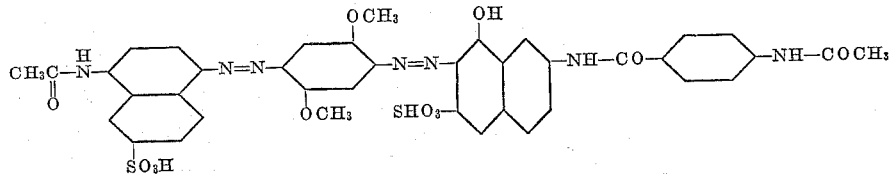

GEORGE J. TAYLOR.

REFERENCES CITED

The following references are of record in the file of this patent:

UNITED STATES PATENTS

| Number | Name | Date |
|---|---|---|
| 2,281,149 | Gaspar | Apr. 28, 1942 |
| 2,294,892 | Carroll et al. | Sept. 8, 1942 |
| 1,877,303 | Grether | Sept. 13, 1932 |
| 1,699,427 | Fellmer | Jan. 15, 1929 |
| 1,855,963 | Hentrich et al. | Apr. 26, 1932 |
| 1,150,675 | Gunther | Aug. 17, 1915 |
| 2,265,425 | Fischer et al. | Dec. 9, 1941 |
| 1,947,027 | Woodward | Feb. 13, 1934 |

FOREIGN PATENTS

| Number | Country | Date |
|---|---|---|
| 259,970 | Great Britain | Jan. 13, 1928 |
| 273,934 | Germany | May 11, 1914 |

Certificate of Correction

Patent No. 2,420,630.

May 13, 1947.

GEORGE J. TAYLOR

It is hereby certified that errors appear in the printed specification of the above numbered patent requiring correction as follows: Column 2, line 40, for "1-amino-3" read *1-amino-4*; column 10, in the claim, for that portion of the formula reading "SHO$_3$" read *HSO$_3$*; and that the said Letters Patent should be read with these corrections therein that the same may conform to the record of the case in the Patent Office.

Signed and sealed this 15th day of July, A. D. 1947.

[SEAL]

LESLIE FRAZER,
*First Assistant Commissioner of Patents.*